United States Patent
Yoo et al.

(10) Patent No.: US 10,389,479 B2
(45) Date of Patent: Aug. 20, 2019

(54) METHOD AND APPARATUS FOR SIGNALING EXPANSION AND BACKWARD COMPATIBILITY PRESERVATION IN WIRELESS COMMUNICATION SYSTEMS

(75) Inventors: Taesang Yoo, San Diego, CA (US); Siddhartha Mallik, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/016,837

(22) Filed: Jan. 28, 2011

(65) Prior Publication Data

US 2011/0188462 A1 Aug. 4, 2011

Related U.S. Application Data

(60) Provisional application No. 61/299,895, filed on Jan. 29, 2010.

(51) Int. Cl.
*H04W 4/00* (2009.01)
*H04W 72/04* (2009.01)
*H04L 1/00* (2006.01)
*H04L 1/18* (2006.01)

(52) U.S. Cl.
CPC .......... *H04L 1/0023* (2013.01); *H04L 1/0039* (2013.01); *H04L 1/1829* (2013.01); *H04L 1/0061* (2013.01)

(58) Field of Classification Search
CPC .................................................. H04L 1/0023
USPC ....................................................... 370/329
See application file for complete search history.

(56) References Cited

U.S. PATENT DOCUMENTS

| | | | |
|---|---|---|---|
| 2005/0135318 A1 | 6/2005 | Walton et al. | |
| 2008/0109711 A1* | 5/2008 | Morioka | H04L 1/0063 714/807 |
| 2008/0165755 A1 | 7/2008 | Marinier et al. | |
| 2008/0267135 A1 | 10/2008 | Legg | |
| 2009/0149162 A1 | 6/2009 | Tenny | |
| 2009/0175372 A1* | 7/2009 | Moon et al. | 375/260 |
| 2009/0325503 A1 | 12/2009 | Tamazawa | |

(Continued)

FOREIGN PATENT DOCUMENTS

| | | |
|---|---|---|
| EP | 2525513 A2 | 11/2012 |
| EP | 2529501 | 8/2017 |

(Continued)

OTHER PUBLICATIONS

International Search Report and Written Opinion—PCT/US2011/023073—ISA/EPO—dated May 26, 2011.

(Continued)

*Primary Examiner* — Luat Phung
(74) *Attorney, Agent, or Firm* — QUALCOMM Incorporated

(57) ABSTRACT

Certain aspects of the present disclosure provide for signaling to expanded capability UEs that may limit the interruption of legacy UEs. According to certain aspects, a base station (e.g., an eNB) may generate and transmit one or more signals containing information that is recognizable by at least one expanded capability UE and identified as invalid by at least one legacy UE. An expanded capability UE may receive such signaling and identifying supplemental information in the signaling, while a legacy UE may regard the signaling as invalid.

40 Claims, 6 Drawing Sheets

(56) References Cited

U.S. PATENT DOCUMENTS

| | | | |
|---|---|---|---|
| 2010/0091675 A1* | 4/2010 | Sawai | H04B 7/063 370/252 |
| 2010/0113078 A1* | 5/2010 | Farajidana | H04B 7/024 455/507 |
| 2010/0279628 A1* | 11/2010 | Love | H04L 5/003 455/70 |
| 2010/0331030 A1* | 12/2010 | Nory et al. | 455/509 |
| 2011/0085513 A1 | 4/2011 | Chen et al. | |
| 2011/0141928 A1* | 6/2011 | Shin et al. | 370/252 |
| 2011/0158170 A1* | 6/2011 | Song et al. | 370/328 |
| 2011/0255485 A1* | 10/2011 | Chen et al. | 370/329 |
| 2012/0035918 A1* | 2/2012 | Frankkila et al. | 704/201 |
| 2012/0147805 A1* | 6/2012 | Kim et al. | 370/312 |

FOREIGN PATENT DOCUMENTS

| | | |
|---|---|---|
| JP | 2010011261 A | 1/2010 |
| WO | WO2006086437 A1 | 8/2006 |
| WO | WO2007109695 | 9/2007 |
| WO | WO-2007109695 A1 | 9/2007 |
| WO | WO2010019679 | 2/2010 |
| WO | 2010088680 A1 | 8/2010 |
| WO | WO2010088559 | 8/2010 |

OTHER PUBLICATIONS

Taiwan Search Report—TW100103703—TIPO—dated Dec. 26, 2013.

RIM: "PDCCH Validation for Semi-Persistent Scheduling Release" 3GPP Draft; R1-090024, 3rd Generation Partnership Project (3GPP), Mobile Competence Centre; 650, Route Des Lucioles; F-06921 Sophia-Antipolis Cedex; France, no. Ljubljana; (Jan. 8, 2009), XP050317972.

Panasonic, "Required Information at the UE in CoMP", 3GPP TSG RAN WG1 Meeting #57bis R1-092530, Jun. 29, 2009, 2 Pages.

European Search Report—EP17186767—Search Authority—Munich—Dec. 5, 2017.

* cited by examiner

METHOD AND APPARATUS FOR SIGNALING EXPANSION AND BACKWARD COMPATIBILITY PRESERVATION IN WIRELESS COMMUNICATION SYSTEMS

CLAIM OF PRIORITY UNDER 35 U.S.C. §120

The present Application for Patent claims priority to U. S. Provisional Application No. 61/299,895, entitled, "METHOD AND APPARATUS FOR SIGNALING EXPANSION AND BACKWARD COMPATIBILITY PRESERVATION IN WIRELESS COMMUNICATION SYSTEMS," filed Jan. 29, 2010, and assigned to the assignee hereof and expressly incorporated herein by reference.

BACKGROUND

Field of the Invention

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Certain aspects of the present disclosure provide a method for wireless communications. The method generally includes generating one or more signals containing information that is recognizable by at least one expanded capability UE and identified as invalid by at least one legacy UE and transmitting the one or more signals.

Certain aspects of the present disclosure provide an apparatus for use in a wireless communication system. The apparatus generally includes means for generating one or more signals containing information that is recognizable by at least one expanded capability User Equipment (UE) and identified as invalid by at least one legacy UE and means for transmitting the one or more signals.

Certain aspects of the present disclosure provide an apparatus for use in a wireless communication system. The apparatus generally includes at least one processor configured to generate one or more signals containing information that is recognizable by at least one expanded capability user equipment (UE) and identified as invalid by at least one legacy UE and transmit the one or more signals; and a memory coupled with the at least one processor.

Certain aspects of the present disclosure provide a computer program product comprising a computer-readable medium having instructions stored thereon. The instructions are generally executable by a processor for generating one or more signals containing information that is recognizable by at least one expanded capability user equipment (UE) and identified as invalid by at least one legacy UE and transmitting the one or more signals.

Certain aspects of the present disclosure provide a method for wireless communications. The method generally includes receiving signaling transmitted by an associated network, identifying supplemental information in the signaling that is regarded as invalid by legacy devices in the associated network, and processing the signaling and the supplemental information contained within the signaling.

Certain aspects of the present disclosure provide an apparatus for use in a wireless communications system. The apparatus generally includes means for receiving signaling transmitted by an associated network, means for identifying supplemental information in the signaling that is regarded as invalid by legacy devices in the associated network, and means for processing the signaling and the supplemental information contained within the signaling.

Certain aspects of the present disclosure provide an apparatus for use in a wireless communications system. The apparatus generally includes at least one processor configured to receive signaling transmitted by an associated network, identify supplemental information in the signaling that is regarded as invalid by legacy devices in the associated network, and process the signaling and the supplemental information contained within the signaling; and a memory coupled with the at least one processor.

Certain aspects of the present disclosure provide a computer program product comprising a computer-readable medium having instructions stored thereon. The instructions are generally executable by a processor for receiving signaling transmitted by an associated network, identifying supplemental information in the signaling that is regarded as invalid by legacy devices in the associated network, and processing the signaling and the supplemental information contained within the signaling.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein can be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network can implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network can implement a radio technology such as Global System for Mobile Communications (GSM). An OFDMA network can implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in portions of the description below.

Single carrier frequency division multiple access (SC-FDMA), which utilizes single carrier modulation and frequency domain equalization is a technique that can be utilized with various aspects described herein. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for an uplink multiple access scheme in 3GPP Long Term Evolution (LTE), or Evolved UTRA.

Figure 1:
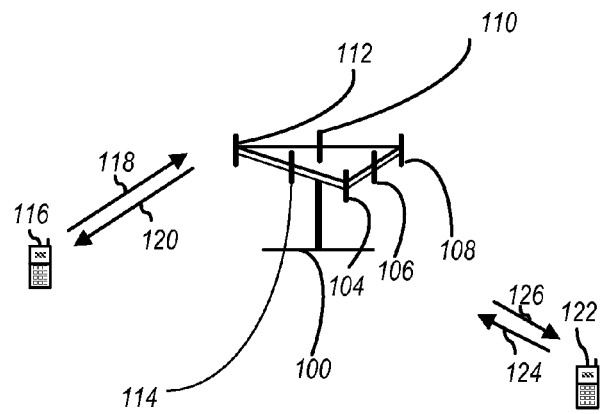
FIG. 1 illustrates a multiple access wireless communication system according to one embodiment.

Referring to FIG. 1, a multiple access wireless communication system according to one embodiment is illustrated. An access point 100 (AP) includes multiple antenna groups, one including 104 and 106, another including 108 and 110, and an additional including 112 and 114. An access point (AP) may also be referred to as a base station (BS), eNodeB, or simply eNB. In FIG. 1, only two antennas are shown for each antenna group, however, more or fewer antennas can be utilized for each antenna group. Access terminal 116 (AT) is in communication with antennas 112 and 114, where antennas 112 and 114 transmit information to access terminal 116 over forward link 120 and receive information from access terminal 116 over reverse link 118. An access terminal (AT) may also be referred to as a user terminal (UT), mobile station (MS), or user equipment (UE). Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 can use different frequency for communication. For example, forward link 120 can use a different frequency then that used by reverse link 118.

Each group of antennas and/or the area in which they are designed to communicate is often referred to as a sector of the access point. In the embodiment, respective antenna groups are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point can be a fixed station used for communicating with the terminals and can also be referred to as an access point, a Node B, or some other terminology. An access terminal can also be called an access terminal, user equipment (UE), a wireless communication device, terminal, access terminal or some other terminology.

Figure 2:
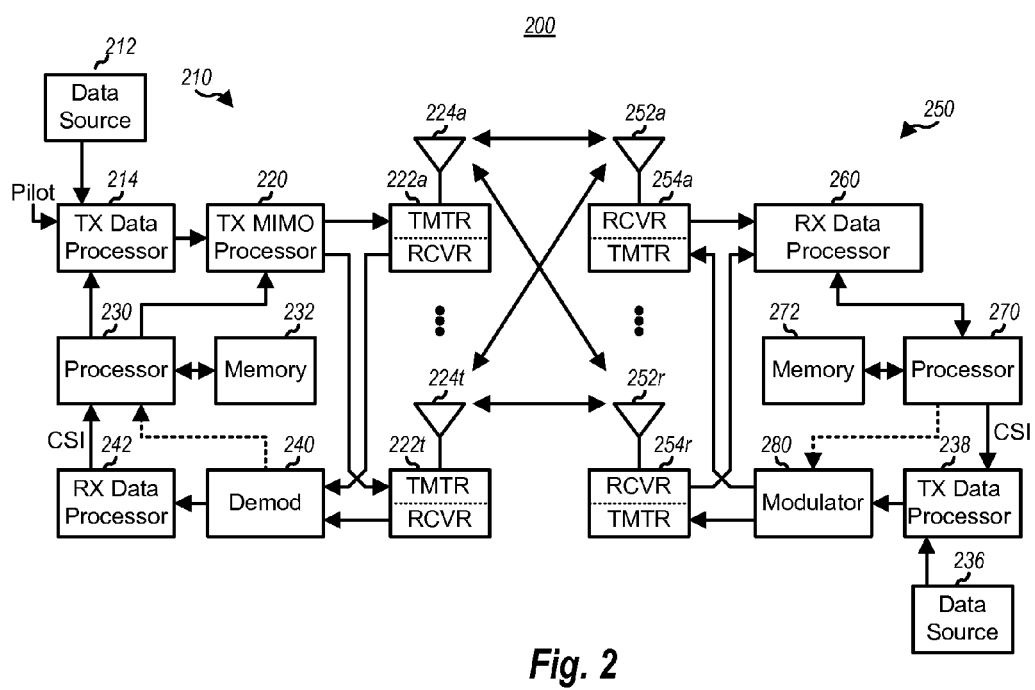
FIG. 2 is a block diagram of a communication system.

FIG. 2 is a block diagram of an embodiment of a transmitter system 210 (also known as an access point) and a receiver system 250 (also known as an access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream can be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream can be determined by instructions performed by processor 230.

The modulation symbols for respective data streams are then provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and down-converts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message can comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights used to process the extracted message.

In an aspect, logical channels are classified into Control Channels and Traffic Channels. Logical Control Channels comprise a Broadcast Control Channel (BCCH), which is a DL channel for broadcasting system control information; a Paging Control Channel (PCCH), which is a DL channel that transfers paging information; and a Multicast Control Channel (MCCH), which is a point-to-multipoint DL channel used for transmitting Multimedia Broadcast and Multicast Service (MBMS) scheduling and control information for one or several MTCHs. Generally, after establishing an RRC connection this channel is used by user equipments (UEs) that receive MBMS (Note: old MCCH+MSCH). Dedicated Control Channel (DCCH) is a point-to-point bi-directional channel that transmits dedicated control information and is used by UEs having an RRC connection. In an aspect, Logical Traffic Channels comprise a Dedicated Traffic Channel (DTCH), which is a point-to-point bi-directional channel, dedicated to one UE, for the transfer of user information; and a Multicast Traffic Channel (MTCH), which is a point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH) and a Paging Channel (PCH), the PCH for support of UE power saving (DRX cycle is indicated by the network to the UE), broadcasted over the entire cell and mapped to PHY resources which can be used for other control/traffic channels. The UL Transport Channels comprise a Random Access Channel (RACH), a Request Channel (REQCH), a Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

For the purposes of the present document, the following abbreviations apply:
AM Acknowledged Mode
AMD Acknowledged Mode Data
ARQ Automatic Repeat Request
BCCH Broadcast Control Channel
BCH Broadcast Channel
C- Control-
CCCH Common Control Channel
CCH Control Channel
CCTrCH Coded Composite Transport Channel
CP Cyclic Prefix
CRC Cyclic Redundancy Check
CTCH Common Traffic Channel
DCCH Dedicated Control Channel
DCH Dedicated Channel
DL DownLink
DSCH Downlink Shared Channel
DTCH Dedicated Traffic Channel
FACH Forward link Access Channel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control Channel MRW Move Receiving Window
MSB Most Significant Bit
MSCH MBMS point-to-multipoint Scheduling Channel
MTCH MBMS point-to-multipoint Traffic Channel
PCCH Paging Control Channel
PCH Paging CHannel
PDU Protocol Data Unit
PHY Physical layer
PhyCH Physical Channels
RACH Random Access Channel
RLC Radio Link Control
RRC Radio Resource Control
SAP Service Access Point
SDU Service Data Unit
SHCCH Shared channel Control Channel
SN Sequence Number
SUFI Super FIeld
TCH Traffic Channel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
CQI Channel Quality Indicator
PUSCH Physical Uplink Shared Channel
PDCCH Physical Downlink Control Channel
DCI Downlink Control Information
CoMP Coordinated MultiPoint
RB Resource Block
RIV Resource Indication Value Signaling Expansion and Backward Compatibility Preservation in Wireless Communication Systems As various standards are advanced, wireless networks need to support UEs that are compatible with different versions of standards. As an example, UEs compatible with current systems (e.g., LTE Rel-8 and Rel-9), referred to herein as "legacy" UEs, may coexist with UEs compatible with later systems (e.g., Rel-10 or later), referred to herein as "expanded capability" UEs. As a result, networks may have a need for an eNB to signal differently to both legacy and expanded-capability UEs having different capabilities. It may be desirable to maintain "backward compatibility" such that the signaling to the expanded capability UEs does not interrupt the operation of legacy UEs.

One approach to provide signaling for expanded capability UEs would be to define a new signaling format understood only by such UEs. Drawbacks to this approach, however, are that (i) it increases signaling overhead; and (ii) it is relatively difficult to define new physical layer signaling (such as a new PDCCH format) without a significant modification of standards. On the other hand, while it may be relatively straightforward to define a higher-layer message, it is typically not appropriate to use higher layer signaling for cases where an immediate action from the UE is intended, as is the case with CoMP CQI reporting, for example.

Another approach to provide signaling for expanded capability UEs would be to modify the format of an existing signaling mechanism, for example, by making changes to the size of existing DCI format 0. However, this approach is non-backward compatible, as legacy UEs would not recognize the new format.

Certain aspects of the present disclosure provide another approach that may help in signaling expanded capability UEs, with little or not interference in the operation of legacy UEs. According to certain aspects, such techniques utilize message fields with values that legacy UEs construe as invalid to achieve new signaling of information to expanded capability UEs, thus preserving backward compatibility.

Thus, certain aspects of the present disclosure may provide a relatively straightforward way to add a signaling intended for expanded capability UEs (e.g., LTE-A UEs) without defining a new signaling format and without modifying an existing signaling format. In this approach, additional signaling information may be included (or "squeezed") into an existing format by utilizing invalid values (that are therefore unused by "legacy" UEs).

Figure 3:
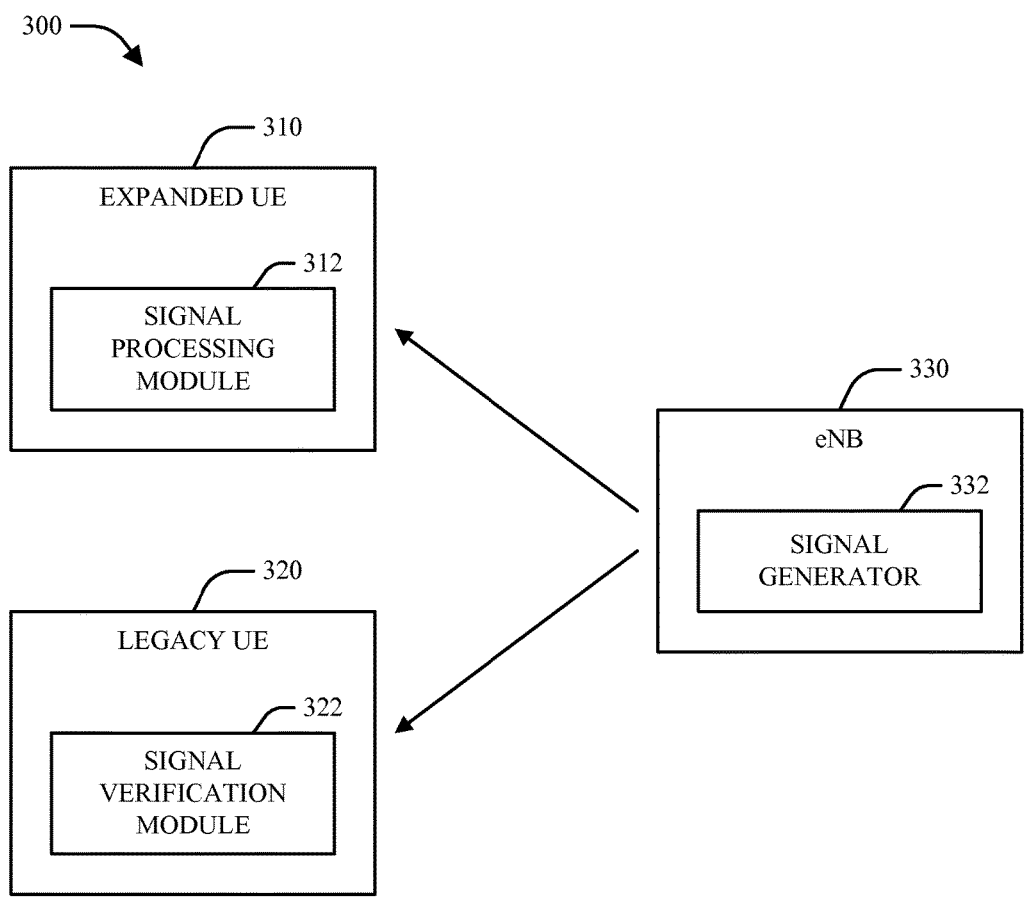
FIG. 3 is a block diagram of a system for communicating and processing expanded signaling in a wireless communication system with preserved backward compatibility.

Turning to FIG. 3, a block diagram of a system 300 for communicating and processing expanded signaling in a wireless communication system with preserved backward compatibility is illustrated. System 300 may include one or more UEs (terminals, mobile or wireless stations, etc.), such as an expanded (expanded capability) UE 310 and a legacy UE 320. UEs 310-320 can communicate with one or more eNBs 330 (base stations, access points, Node Bs, network cells, etc.) on an uplink and/or downlink. In an aspect, UEs 310-320 and eNB 330 can include any number of antennas (not shown) for UL/DL communication within system 300.

In various wireless communication deployments, respective UEs can be configured with different levels of capability. Thus, for example, system 300 can include one or more expanded UEs 310, which can be capable of respective advanced functionality and/or features (e.g., as provided by LTE-A and/or another suitable communication standard), as well as one or more legacy UEs 320 that are not configured to utilize such advanced functionality and/or features.

In an aspect, in a system such as system 300, where expanded UEs 310 and legacy UEs 320 coexist, it is desirable for eNB 330 to signal differently to UEs 310-320 with different capabilities. On the other hand, however, it can be appreciated that it is further desirable for signaling to respective expanded UEs 310 to be transparent, such that it does not interrupt the operation of existing legacy UEs 320 (e.g., such that backward compatibility is maintained).

As a specific, non-limiting example, it may be appreciated that existing LTE systems (e.g., Rel-8 and Rel-9) define aperiodic CQI feedback on PUSCH. Such aperiodic feedback is typically triggered by a CQI request in an uplink grant via, e.g., PDCCH DCI format 0.

Conventionally, DCI format 0 allocates one bit for signaling the presence or absence of a CQI request. However, for expanded UEs 310 using LTE-A or the like, it may be desirable in some cases for eNB 330 to have the ability to signal additional information along with the one-bit CQI request.

As an example, in the case of CQI feedback for CoMP systems (where multiple eNBs coordinate transmissions to a single UE), the full feedback amount may, in some cases, exceed the capacity of a single feedback instance. In this case, additional signaling may be used to define exactly what information and how much to feed back, thereby potentially reducing the overall feedback amount. On the other hand, it may be desirable for any modification of DCI format 0 (relative to current versions) to consider backward compatibility of legacy UEs 320.

In view of at least the above, according to certain aspects, eNB 330 may utilize a signal generator 332 and/or other mechanisms to signal additional information to expanded UEs 310 in a manner designed to avoid or reduce interrupting legacy UEs 320 to achieve backward compatibility.

According to certain aspects, signal generator 332 may achieve such ends by utilizing a value in a signaling field that is interpreted as valid by expanded capability UEs 310, but invalid by legacy UEs. Thus, upon receiving such a signal, a legacy UE 320, via a signal verification module 322 and/or other mechanisms, may recognize that the value is invalid and therefore ignore the signaling. In contrast, expanded capability UEs 310 can be configured to recognize the meaning of the value such that a signal processing module 312 and/or other means can respond to the signaling appropriately. In this manner, eNB 330 may utilize signaling intended for only expanded UEs 310, while avoiding or at least minimizing interruption of legacy UEs 320. Thus, according to certain aspects of the present disclosure, upon receiving a valid value within signaling from eNB 330, both expanded capability UEs 310 and legacy UEs 320 may interpret the value in the same (backward compatible) manner.

According to certain aspects, a legacy may determine valid values for various signaling fields as dictated by current versions of a standard. As an example, again referring again to the specific, non-limiting example of DCI format 0, it can be appreciated that the Resource Indication Value (RIV) field in DCI format 0 is typically used to convey a starting RB index and number of Resource Blocks (RBs). Legacy UEs may recognize a version of the standard that restricts the number of RBs (y) to satisfy the following equation:

$$y = 2^{\{x1\}} * 3^{\{x2\}} * 5^{\{x3\}}$$

Thus, it may be appreciated that only a limited number of values for the RIV field exist that specify a number of RBs that satisfies this equation. All other values may be considered invalid by legacy (e.g., LTE) UEs. Accordingly, some or all of such values, considered invalid by legacy UEs, may be redefined for additional signaling to expanded capability (e.g., LTE-A) UEs.

Thus, for example, one or more invalid values may be utilized to indicate additional parameters for CoMP CQI requests or the like to LTE-A UEs. Such additional parameters may, for example, signal whether the UE should feed back CQI/PMI/RI of the serving cell only or whether the UE should feed back CQI/PMI/RI of neighboring cells as well as the serving cell. Alternatively, or additionally, such additional parameters may signal the UE to break down the feedback contents into two (or more) instances to be fed back on separate uplink subframes.

It should be appreciated that while the above is a specific example relating to techniques for signaling additional information in DCI format 0 for CoMP feedback for LTE-A UEs, the concepts and techniques described herein may be more generally applied, for example, to any scenario where versatile, backward-compatible signaling is desired for terminal devices of varying capability levels in a wireless communication environment. As an example, the techniques described above can be applied to any network environment where it is desirable to preserve backward compatibility of signaling for UEs not capable of new features, maintain backward compatible signaling for new-feature capable (expanded capability) UEs, and provide new, expanded signaling for new-feature-capable UEs.

As another example involving LTE, DCI format 1A, used for downlink grants, may be utilized in a similar manner as described above to signal special usages for an LTE-A UE. More generally, it may be appreciated that any other suitable signaling format operable to achieve the above stated ends may also be performed.

In an aspect, it can be appreciated that the techniques described above can operate to achieve new signaling to a new class of UEs (e.g., expanded capability UEs 310, such as LTE-A UEs or the like) while maintaining backward compatible signaling to the new class of UEs and an old class of UEs (e.g., legacy UEs 320, such as LTE UEs or the like). In one example, this can be achieved by utilizing an existing signaling format (e.g., without introducing additional signaling mechanisms or formats).

Figure 4:
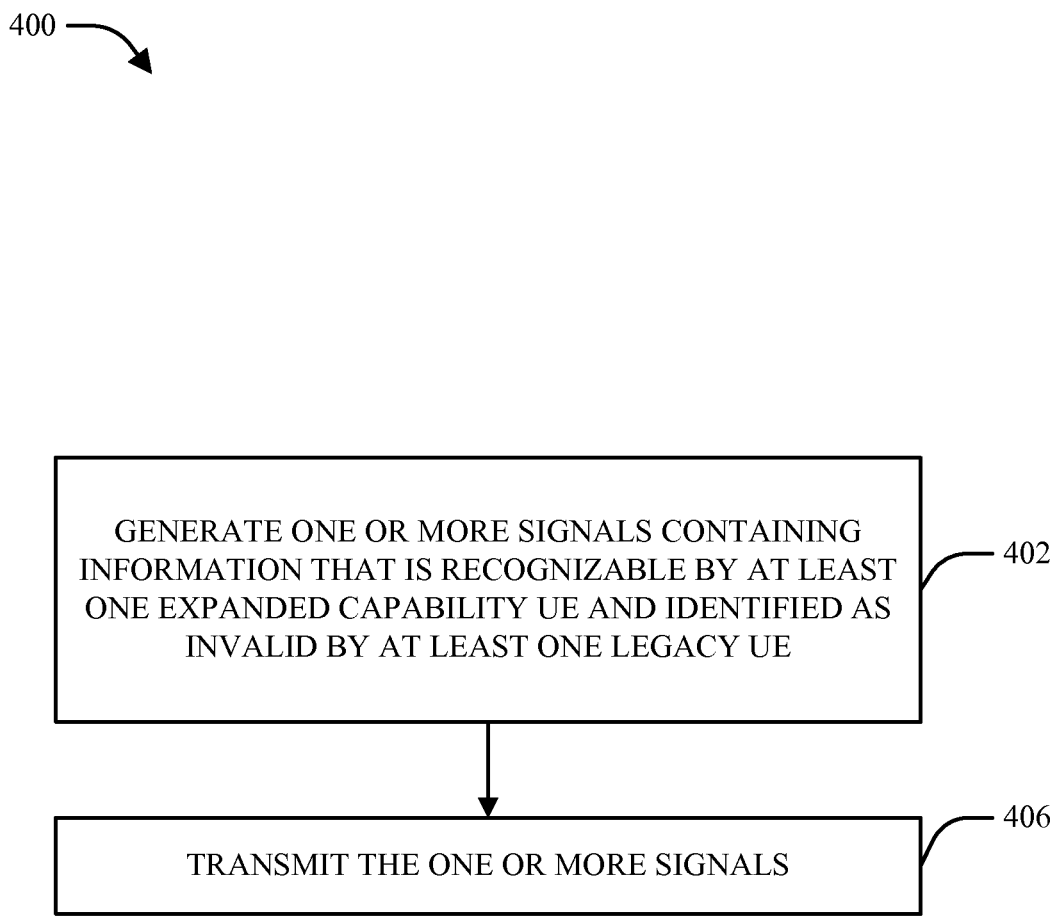
FIG. 4 is a flow diagram of a methodology that facilitates signaling expansion with backward compatibility preservation in a wireless communication environment.

FIG. 4 illustrates example operations 400 in accordance with certain aspects of the present disclosure that may help facilitate signaling expansion with backward compatibility preservation in a wireless communication environment. The operations may be performed, for example, by an eNB (e.g., eNB 330) that supports both legacy and expanded capability UEs. At 402, one or more signals are generated that contain information that is recognizable as valid by the at least one expanded capability UE and recognizable as invalid by the at least one legacy UE. At block 404, the one or more signals are transmitted.

As noted above, the operations 400 may also include identifying a set of valid values for specifying a number of resource blocks (RBs) to the at least one legacy UE and the generating may include generating one or more signals that specify a number of RBs that is not in the set of valid values. The generating may also include generating one or more signals that enable one or more features at the at least one expanded capability UE that are not supported by the at least one legacy UE.

Figure 5:
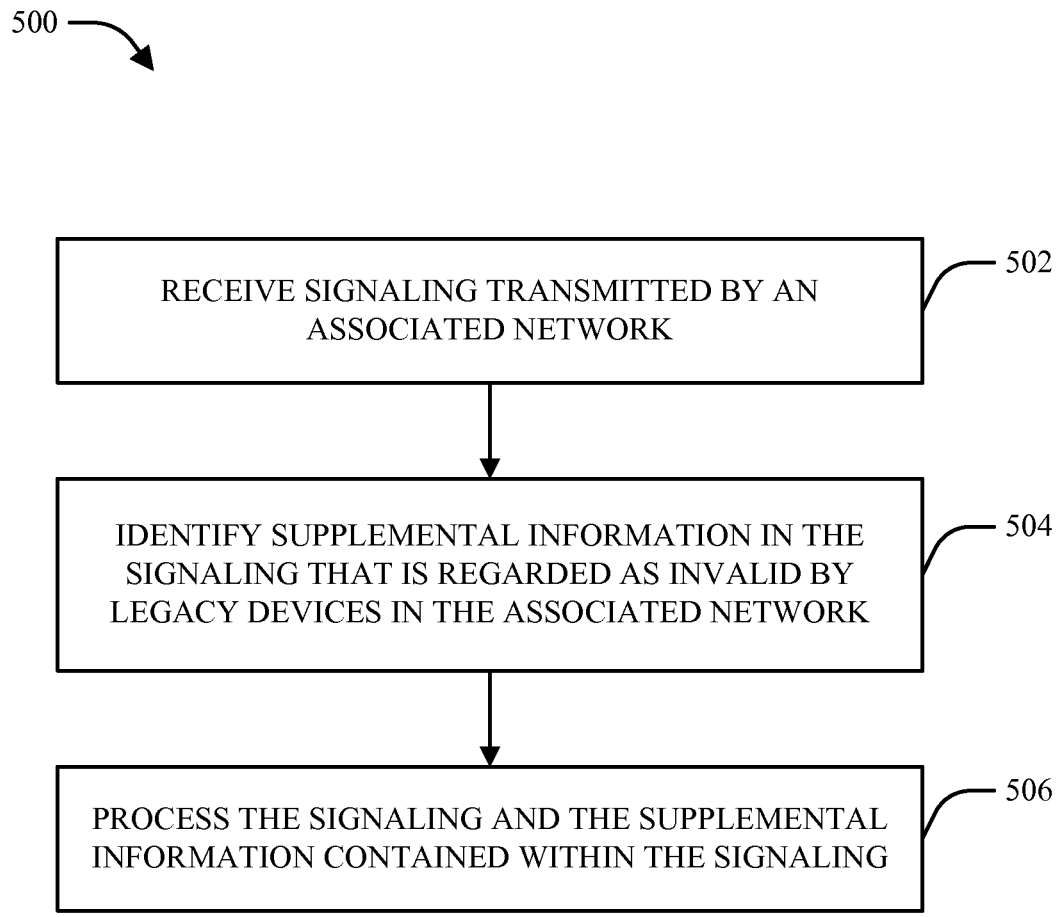
FIG. 5 is a flow diagram of a methodology that facilitates processing expanded signaling within a wireless communication network.

FIG. 5 illustrates example operations 500 in accordance with certain aspects of the present disclosure that may help facilitate processing expanded signaling within a wireless communication network. The operations may be performed, for example, by an expanded capability UE (e.g., expanded UE 310). At block 502, signaling transmitted by an associated network is received. At block 504, supplemental information is identified in the signaling that is regarded as invalid by legacy devices in the associated network. At block 506, the signaling and the supplemental information contained within the signaling are processed by the expanded capability UE 310.

Figure 6:
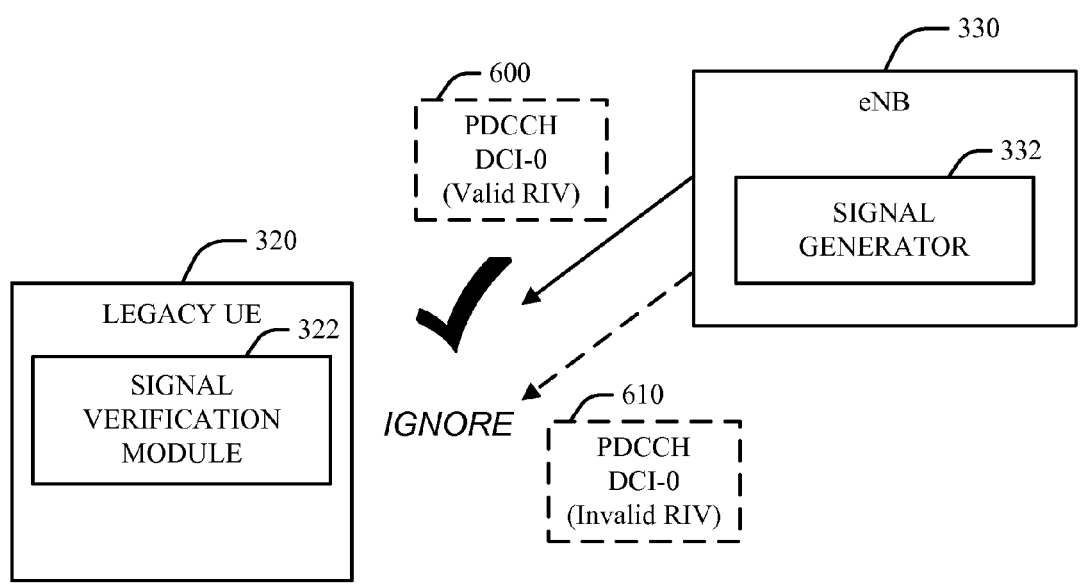
FIG. 6 illustrates an example transmission of a message involving a value considered valid to both legacy and expanded capability UEs.
Figure 7:
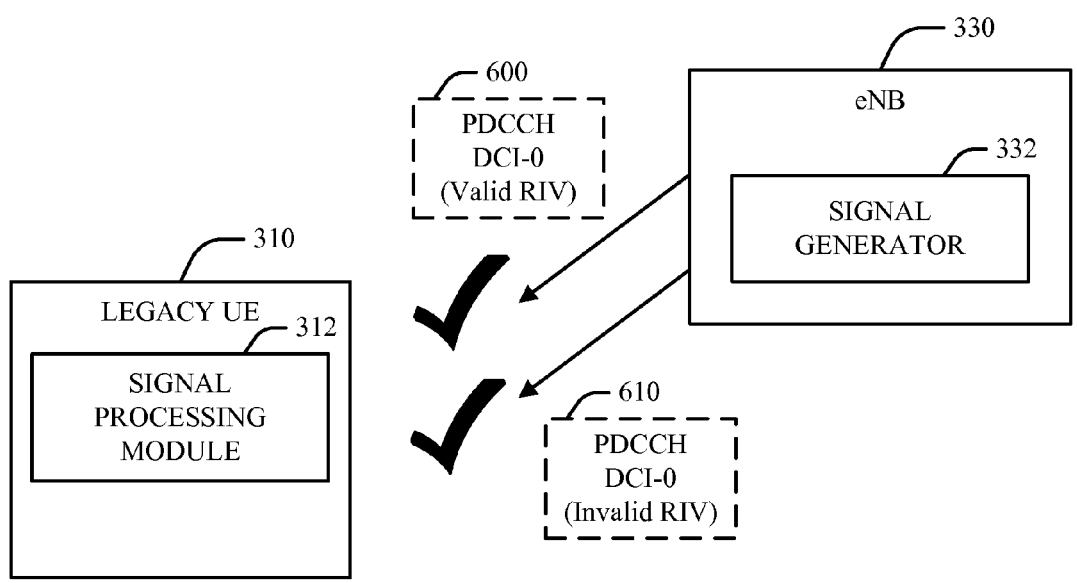
FIG. 7 illustrates an example transmission of a message involving a value considered invalid to a legacy UE while indicating additional information to an expanded capability UE.

FIGS. 6 and 7 provide a simple illustration of aspects of the present disclosure utilizing the system shown in FIG. 3 and the aforementioned example involving DCI format 0. As illustrated in FIG. 6, if eNB 330 generates and transmits a PDCCH 600 with a DCI message formatted according to DCI format 0 having a valid RIV value, the legacy UE 320 may properly decode and interpret the message, as indicated by the check mark. On the other hand, the legacy UE 320 will ignore a PDCCH 610 having an invalid RIV value, as indicated by the dashed arrow. As illustrated in FIG. 7, however, the expanded capability UE 310 is able to properly decode and interpret both PDCCH 600 having a valid RIV value and PDCCH 610 having an invalid RIV value.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method used in a wireless communication system, comprising:
    determining information that would be identified as invalid when decoded by at least one legacy UE;
    generating one or more signals containing the information that is recognizable by at least one expanded capability user equipment (UE) and identified as invalid by the at least one legacy UE based on the determination, wherein the information is related to a feedback request that is recognizable by the at least one expanded capability UE, and wherein the information relating to the feedback request is identified as invalid by the at least one legacy UE; and
    transmitting the one or more signals.

2. The method of claim 1, wherein the one or more signals comprise a value in a signaling field that is interpreted by expanded UEs as valid and interpreted by legacy UEs as invalid.

3. The method of claim 1, wherein the one or more signals are generated according to a downlink control information (DCI) message format 0.

4. The method of claim 1, wherein the determination comprises identifying a set of valid values for specifying a number of resource blocks (RBs) to the at least one legacy UE and the generating further comprises generating one or more signals that specify a number of RBs that is not in the set of valid values.

5. The method of claim 1, wherein the feedback request includes a Coordinated Multipoint (CoMP) CQI request.

6. The method of claim 1, wherein the one or more signals are generated according to a downlink control information (DCI) message format 1A.

7. The method of claim 1, wherein the generating comprises generating one or more signals that enable one or more features at the at least one expanded capability UE that are not supported by the at least one legacy UE.

8. An apparatus for use in a wireless communication system, comprising:
    means for determining information that would be identified as invalid when decoded by at least one legacy UE;
    means for generating one or more signals containing information that is recognizable by at least one expanded capability User Equipment (UE) and identified as invalid by at least one legacy UE based on the determination, wherein the information is related to a feedback request that is recognizable by the at least one expanded capability UE, and wherein the information relating to the feedback request is identified as invalid by the at least one legacy UE; and
    means for transmitting the one or more signals.

9. The apparatus of claim 8, wherein the one or more signals comprise a value in a signaling field that is interpreted by expanded UEs as valid and interpreted by legacy UEs as invalid.

10. The apparatus of claim 8, wherein the one or more signals are generated according to a downlink control information (DCI) message format 0.

11. The apparatus of claim 8, wherein the means for determining comprises means for identifying a set of valid values for specifying a number of Resource Blocks (RBs) to the at least one legacy UE and the means for generating comprises means for generating one or more signals that specify a number of RBs that is not in the set of valid values.

12. The apparatus of claim 8, wherein the feedback request includes a Coordinated Multipoint (CoMP) CQI request.

13. The apparatus of claim 8, wherein the one or more signals are generated according to a downlink control information (DCI) message format 1A.

14. The apparatus of claim 8, wherein the means for generating comprises means for generating one or more signals that enable one or more features at the at least one expanded capability UE that are not supported by the at least one legacy UE.

15. An apparatus for use in a wireless communication system, comprising:
at least one processor configured to:
determine information that would be identified as invalid when decoded by at least one legacy UE;
generate one or more signals containing information that is recognizable by at least one expanded capability user equipment (UE) and identified as invalid by at least one legacy UE based on the determination, wherein the information is related to a feedback request that is recognizable by the at least one expanded capability UE, and wherein the information relating to feedback request is identified as invalid by the at least one legacy UE; and
transmit the one or more signals; and
a memory coupled with the at least one processor.

16. The apparatus of claim 15, wherein the one or more signals comprise a value in a signaling field that is interpreted by expanded UEs as valid and interpreted by legacy UEs as invalid.

17. The apparatus of claim 15, wherein the one or more signals are generated according to a downlink control information (DCI) message format 0.

18. The apparatus of claim 15, wherein the determination comprises identifying a set of valid values for specifying a number of Resource Blocks (RBs) to the at least one legacy UE and the generation comprises generating one or more signals that specify a number of RBs that is not in the set of valid values.

19. The apparatus of claim 15, wherein the feedback request includes a Coordinated Multipoint (CoMP) CQI request.

20. The apparatus of claim 15, wherein the one or more signals are generated according to a downlink control information (DCI) message format 1A.

21. The apparatus of claim 15, wherein the at least one processor is configured to generate one or more signals that enable one or more features at the at least one expanded capability UE that are not supported by the at least one legacy UE.

22. A non-transitory computer-readable medium having instructions stored thereon, the instructions executable by a processor for:
determining information that would be identified as invalid when decoded by at least one legacy UE;
generating one or more signals containing information that is recognizable by at least one expanded capability user equipment (UE) and identified as invalid by at least one legacy UE based on the determination, wherein the information is related to a feedback request that is recognizable by the at least one expanded capability UE, and wherein the information relating to feedback request is identified as invalid by the at least one legacy UE; and
transmitting the one or more signals.

23. A method used in a wireless communication system, comprising:
receiving signaling transmitted by an associated network;
identifying supplemental information in the signaling that is regarded as invalid by legacy devices in the associated network, wherein the supplemental information is related to a feedback request, wherein the supplemental information is interpreted by expanded devices as valid and would be interpreted by the legacy devices as invalid when decoded by the legacy devices; and
processing the signaling and the supplemental information contained within the signaling.

24. The method of claim 23, wherein the receiving comprises receiving signaling formatted according to DCI format 0.

25. The method of claim 23, wherein the identifying comprises identifying information in the signaling provided as a number of Resource Blocks (RBs) that is regarded as an invalid number of RBs by the legacy devices in the associated network.

26. The method of claim 23, wherein the supplemental information includes a Coordinated Multipoint (CoMP) CQI request.

27. The method of claim 23, wherein the receiving comprises receiving signaling formatted according to DCI format 1A.

28. An apparatus for use in a wireless communication system, comprising:
means for receiving signaling transmitted by an associated network;
means for identifying supplemental information in the signaling that is regarded as invalid by legacy devices in the associated network, wherein the supplemental information is related to a feedback request, wherein the supplemental information is interpreted by expanded devices as valid and would be interpreted by the legacy devices as invalid when decoded by the legacy devices; and
means for processing the signaling and the supplemental information contained within the signaling.

29. The apparatus of claim 28, wherein the means for receiving comprises means for receiving signaling formatted according to DCI format 0.

30. The apparatus of claim 28, wherein the means for identifying comprises means for identifying information in the signaling provided as a number of Resource Blocks (RBs) that is regarded as an invalid number of RBs by the legacy devices in the associated network.

31. The apparatus of claim 28, wherein the supplemental information includes a Coordinated Multipoint (CoMP) CQI request.

32. The apparatus of claim 28, wherein the means for receiving comprises means for receiving signaling formatted according to DCI format 1A.

33. An apparatus for use in a wireless communication system, comprising:
at least one processor configured to:
receive signaling transmitted by an associated network;
identify supplemental information in the signaling that is regarded as invalid by legacy devices in the associated network, wherein the supplemental information is related to a feedback request, wherein the supplemental information is interpreted by expanded devices as valid and would be interpreted by the legacy devices as invalid when decoded by the legacy devices; and process the signaling and the supplemental information contained within the signaling; and a memory coupled with the at least one processor.

34. The apparatus of claim 33, wherein the receiving comprises receiving signaling formatted according to DCI format 0.

35. The apparatus of claim 33, wherein the at least one processor is configured to identify information in the signaling provided as a number of Resource Blocks (RBs) that is regarded as an invalid number of RBs by the legacy devices in the associated network.

36. The apparatus of claim 33, wherein the supplemental information includes a Coordinated Multipoint (CoMP) CQI request.

37. The apparatus of claim 33, wherein the at least one processor is configured to receive signaling formatted according to DCI format 1A.

38. A non-transitory computer-readable medium having instructions stored thereon, the instructions executable by a processor for:

receiving signaling transmitted by an associated network;

identifying supplemental information in the signaling that is regarded as invalid by legacy devices in the associated network, wherein the supplemental information is related to a feedback request, wherein the supplemental information is interpreted by expanded devices as valid and would be interpreted by the legacy devices as invalid when decoded by the legacy devices; and processing the signaling and the supplemental information contained within the signaling.

39. The method of claim 1, wherein the feedback request triggers reporting at least one of Channel Quality Information (CQI), Precoding Matrix Indicator (PMI), or Rank Indicator (RI) by the expanded capability UE.

40. The method of claim 23, wherein the feedback request triggers reporting at least one of Channel Quality Information (CQI), Precoding Matrix Indicator (PMI), or Rank Indicator (RI) by expanded user equipments.

* * * * *